US012406818B2

(12) United States Patent
Fujiwara

(10) Patent No.: US 12,406,818 B2
(45) Date of Patent: Sep. 2, 2025

(54) ELECTRIC CIRCUIT BREAKER DEVICE

(71) Applicant: DAICEL CORPORATION, Osaka (JP)

(72) Inventor: Tomohide Fujiwara, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 203 days.

(21) Appl. No.: 18/269,839

(22) PCT Filed: Dec. 27, 2021

(86) PCT No.: PCT/JP2021/048500
§ 371 (c)(1),
(2) Date: Jun. 27, 2023

(87) PCT Pub. No.: WO2022/145413
PCT Pub. Date: Jul. 7, 2022

(65) Prior Publication Data

US 2024/0062976 A1 Feb. 22, 2024

(30) Foreign Application Priority Data

Dec. 28, 2020 (JP) ................................ 2020-219386

(51) Int. Cl.
*H01H 39/00* (2006.01)
*H01H 9/30* (2006.01)
*H01H 9/52* (2006.01)

(52) U.S. Cl.
CPC .............. *H01H 39/00* (2013.01); *H01H 9/30* (2013.01); *H01H 9/52* (2013.01)

(58) Field of Classification Search
CPC . F42B 3/10; B61R 21/00; B61R 21/16; B61R 21/264; B61R 21/2644;
(Continued)

(56) References Cited

U.S. PATENT DOCUMENTS 9,099,268 B2 * 8/2015 Oberg .................... H01H 33/91
2014/0061161 A1 3/2014 Nakamura et al.
(Continued)

FOREIGN PATENT DOCUMENTS

JP 2014-49300 A 3/2014
JP 2018-6082 A 1/2018

OTHER PUBLICATIONS

International Search Report for International Application No. PCT/JP2021/048500, dated Mar. 8, 2022, with English translation.
(Continued)

*Primary Examiner* — Anthony R Jimenez
(74) *Attorney, Agent, or Firm* — Birch, Stewart, Kolasch & Birch, LLP

(57) ABSTRACT

An electric circuit breaker device includes: an igniter provided to a housing; a projectile disposed in an accommodating space formed in the housing, the projectile being to be projected along the accommodating space by energy received from the igniter; a conductor piece that is provided to the housing, forms a portion of an electric circuit, and includes in a portion thereof a cutoff portion disposed crossing the accommodating space and to be cut off by the projectile; and an arc-extinguishing region that is provided in the accommodating space and in which a coolant material is disposed, the arc-extinguishing region being configured to receive the cutoff portion after being cut off. The projectile includes a first projectile configured to cut off the cutoff portion from the conductor piece by being projected by the energy received from the igniter, and a second projectile configured to press, into the arc-extinguishing region, the cutoff portion cut off by the first projectile.

7 Claims, 5 Drawing Sheets

(58) Field of Classification Search
CPC ...... B61R 2021/01; B61R 2021/01034; H01H 2003/00; H01H 2003/02; H01H 2003/022; H01H 2003/0233; H01H 2003/026; H01H 2003/0273; H01H 2009/04; H01H 2009/048; H01H 2201/01; H01H 2223/00; H01H 2223/002; H01H 2223/006; H01H 2231/026; H01H 85/00; H01H 39/004; H01H 39/006; H01H 9/00; H01H 9/04; H01H 9/32; H01H 9/042; H01H 3/00; H01H 3/02; H01H 9/02; H01H 9/0264; H01H 9/043; H01H 9/045; H01H 13/50; H01H 9/30; H01H 9/52; H01H 39/00; B60L 3/00; B60L 3/04
USPC ........................................................ 200/61.08
See application file for complete search history.

(56) References Cited

U.S. PATENT DOCUMENTS

2015/0248979 A1* 9/2015 Parks .................. H01H 39/004
200/61.08
2019/0206646 A1 7/2019 Yamada et al.

OTHER PUBLICATIONS

Written Opinion of the International Searching Authority for International Application No. PCT/JP2021/048500, dated Mar. 8, 2022, with English translation.
Extended European Search Report for European Application No. 21915273.3, dated Sep. 11, 2024.

* cited by examiner

ELECTRIC CIRCUIT BREAKER DEVICE

TECHNICAL FIELD

The present invention relates to an electric circuit breaker device.

BACKGROUND ART

An electric circuit may be provided with a breaker device configured to be actuated when an abnormality occurs in a device constituting the electric circuit or when an abnormality occurs in a system in which the electric circuit is mounted, thereby urgently interrupting the continuity of the electric circuit. Electric circuit breaker devices have been proposed in which, according to one aspect thereof, a projectile is moved at high speed by energy applied from an igniter or the like to forcibly and physically cut a conductor piece that forms a portion of an electric circuit (refer to Patent Documents 1 and 2 and the like, for example). Further, in recent years, electric circuit breaker devices applied to electric vehicles equipped with a high-voltage power source are becoming increasingly important.

CITATION LIST

Patent Literature

Patent Document 1: JP 2014-49300 A
Patent Document 2: JP 2018-6082 A

SUMMARY OF INVENTION

Technical Problem

In an electric circuit breaker device, an arc is likely to occur when a conductor piece forming a portion of an electric circuit is cut. When an arc occurs, the electric circuit cannot be interrupted quickly, and thus the electric circuit breaker device must quickly extinguish the generated arc.

The technique of the present disclosure has been made in view of the circumstances described above, and an object thereof is to provide an electric circuit breaker device capable of quickly extinguishing an arc during actuation.

Solution to Problem

To solve the problems described above, in an electric circuit breaker device according to the present disclosure, a projectile to be projected along an accommodating space formed in a housing by energy received from an igniter includes a first projectile configured to cut off a cutoff portion from a conductor piece by being projected by the energy received from the igniter, and a second projectile configured to press, into an arc-extinguishing region of the accommodating space in which a coolant material is disposed, the cutoff portion cut off by the first projectile.

More specifically, the electric circuit breaker device according to the present disclosure includes: an igniter provided to a housing; a projectile disposed in an accommodating space, the accommodating space being formed in the housing and extending in one direction, the projectile being to be projected along the accommodating space by energy received from the igniter; a conductor piece that is provided to the housing, forms a portion of an electric circuit, and includes in a portion thereof a cutoff portion disposed crossing the accommodating space and to be cut off by the projectile; and an arc-extinguishing region that is provided in the accommodating space and in which a coolant material is disposed, the arc-extinguishing region being configured to receive the cutoff portion after being cut off, in which the projectile includes a first projectile configured to cut off the cutoff portion from the conductor piece by being projected by the energy received from the igniter, and a second projectile configured to press, into the arc-extinguishing region, the cutoff portion cut off by the first projectile.

Here, the second projectile may be attached to the first projectile prior to actuation of the igniter, and may be projected from the first projectile by the energy received from the igniter.

Further, the second projectile may be smaller in size than the first projectile.

Further, the second projectile may be smaller in transverse cross-sectional area than the first projectile.

Further, the second projectile may be attached to the first projectile with the second projectile positioned coaxially with the first projectile prior to actuation of the igniter.

Further, the second projectile may be attached to the first projectile with a center axis of the second projectile extending through or near a planar center portion of the cutoff portion prior to actuation of the igniter.

Further, the first projectile may include a cutoff surface disposed facing the cutoff portion prior to actuation of the igniter and configured to cut off the cutoff portion, an attachment recessed portion opening in the cutoff surface and configured to be attached with the second projectile, and a communication path through which the energy received from the igniter is guided to a pressure receiving portion of the second projectile attached to the attachment recessed portion.

Advantageous Effects of Invention

According to the present disclosure, it is possible to provide an electric circuit breaker device capable of quickly extinguishing an arc that occurs during actuation.

DESCRIPTION OF EMBODIMENTS

An electric circuit breaker device according to an embodiment of the present disclosure will be described below with reference to the drawings. Note that the configurations, combinations thereof, and the like in the embodiment are examples, and various additions, omissions, substitutions, and other changes may be made as appropriate without departing from the spirit of the present disclosure. The present disclosure is not limited by the embodiments and is limited only by the claims.

Configuration

Figure 1:
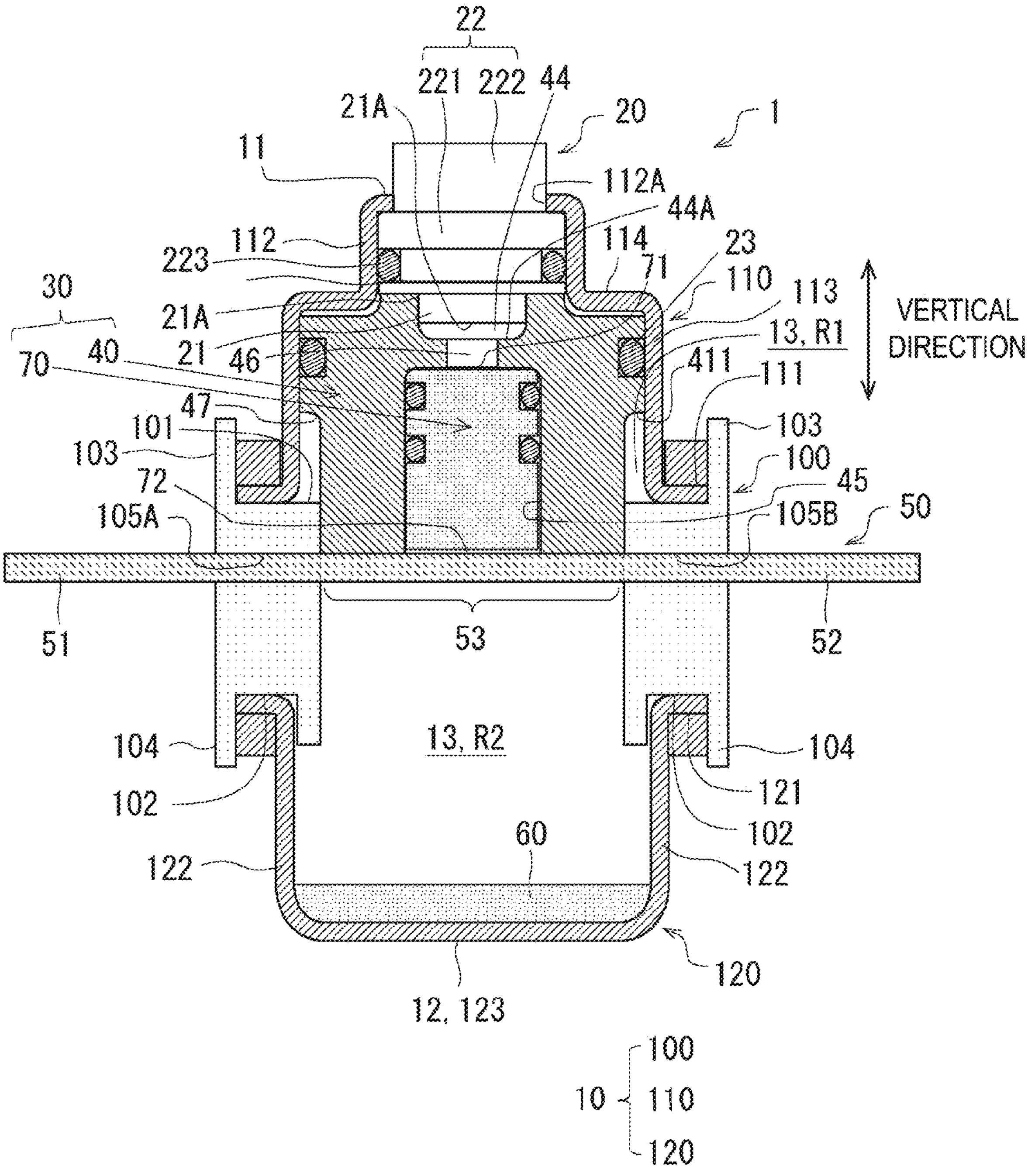
FIG. 1 is a view illustrating an internal structure of a breaker device.

FIG. 1 is a view illustrating an internal structure of an electric circuit breaker device (hereinafter simply referred to as the "breaker device") 1 according to an embodiment. The breaker device 1 is a device configured to interrupt an electric circuit included in a vehicle, an electric home appliance, or the like when an abnormality occurs in the electric circuit or in a system including a lithium battery (lithium ion battery, for example) of the electric circuit, thereby preventing great damage, for example. In the present specification, a cross section along the height direction illustrated in FIG. 1 (direction in which an accommodating space 13 described later extends) is referred to as a vertical cross section of the breaker device 1, and a cross section in a direction orthogonal to the vertical cross section is referred to as a transverse cross section of the breaker device 1. FIG. 1 illustrates a state prior to actuation of the breaker device 1.

The breaker device 1 includes a housing 10 as an outer shell member, an igniter 20, a projectile 30, a conductor piece 50, and a coolant material. The housing includes the accommodating space 13 that extends in a direction from a first end portion 11 on an upper end side to a second end portion 12 on a lower end side. This accommodating space 13 is a space formed in a straight line, making the projectile 30 movable, and extends along a vertical direction of the breaker device 1. As illustrated in FIG. 1, the accommodating space 13 formed inside the housing 10 accommodates the projectile 30. Note that as described in detail later, the projectile 30 includes a first projectile 40 and a second projectile 70 attached to the first projectile 40 in a pre-actuation initial state prior to actuation of the breaker device 1. However, in the present specification, the vertical direction of the breaker device 1 merely indicates a relative positional relationship among the elements in the breaker device 1 for convenience of description of the embodiment.

Housing

The housing 10 includes a housing body 100, a top holder 110, and a bottom container 120. The housing body 100 is bonded to the top holder 110 and the bottom container 120, thereby forming the housing 10 that is integral.

The housing body 100 has, for example, a substantially prismatic outer shape. However, the shape of the housing body 100 is not particularly limited. The housing body 100 includes a cavity portion formed therethrough along the vertical direction. This cavity portion forms a portion of the accommodating space 13. Furthermore, the housing body 100 includes an upper surface 101 to which a flange portion 111 of the top holder 110 is fixed and a lower surface 102 to which a flange portion 121 of the bottom container 120 is fixed. In the present embodiment, an upper tubular wall 103 having a tubular shape is provided erected upward from the upper surface 101 on the outer circumferential side of the upper surface 101 in the housing body 100. In the present embodiment, the upper tubular wall 103 has a rectangular tubular shape, for example, but may have other shapes. On the outer circumferential side of the lower surface 102 in the housing body 100, a lower tubular wall 104 having a tubular shape is provided suspended downward from the lower surface 102. In the present embodiment, the lower tubular wall 104 has a rectangular tubular shape, for example, but may have other shapes. The housing body 100 configured as described above can be formed from an insulating member such as a synthetic resin, for example. For example, the housing body 100 may be formed from nylon, which is a type of polyamide synthetic resin.

Top Holder

Next, the top holder 110 will be described. The top holder 110 is, for example, a cylindrical member having a stepped cylindrical tubular shape with a hollow inside. The top holder 110 includes a small diameter cylinder portion 112 positioned on the upper side (first end portion 11 side), a large diameter cylinder portion 113 positioned on the lower side, a connection portion 114 connecting these, and the flange portion 111 extending outward from a lower end of the large diameter cylinder portion 113. For example, the small diameter cylinder portion 112 and the large diameter cylinder portion 113 are coaxially disposed and have cylindrical tubular shapes. The large diameter cylinder portion 113 has a diameter slightly larger than that of the small diameter cylinder portion 112. The connection portion 114 extends in a radial direction of the small diameter cylinder portion 112 and the large diameter cylinder portion 113, thereby connecting them to each other.

The contour of the flange portion 111 in the top holder 110 has a substantially quadrangular shape that fits inside the upper tubular wall 103 in the housing body 100. For example, the flange portion 111 may be integrally fastened to the upper surface 101 in the housing body 100 using a screw or the like, or may be fixed thereto by a rivet or the like, in a state of being disposed inside the upper tubular wall 103. Further, the top holder 110 may be bonded to the housing body 100 in a state where a sealant is applied between the upper surface 101 of the housing body 100 and a lower surface of the flange portion 111 in the top holder 110. This can increase airtightness of the accommodating space 13 formed in the housing 10. Further, instead of the sealant or in combination with the sealant, an O-ring may be interposed between the upper surface 101 of the housing body 100 and the flange portion 111 of the top holder 110 to increase the airtightness of the accommodating space 13.

The cavity portion formed inside the small diameter cylinder portion 112 in the top holder 110 functions as an accommodating space for accommodating a portion of the igniter 20 as illustrated in FIG. 1. Further, the cavity portion formed inside the large diameter cylinder portion 113 in the top holder 110 communicates with the cavity portion of the housing body 100 positioned below, and forms a portion of the accommodating space 13. The top holder 110 configured as described above can be formed from an appropriate metal member, such as stainless steel or aluminum, having excellent strength and durability, for example. However, a material for forming the top holder 110 is not particularly limited. Also, for the shape of the top holder 110, the above aspect is an example and other shapes may be adopted.

Bottom Container

Next, the bottom container 120 will be described. The bottom container 120 has a substantially tubular bottomed shape with a hollow inside, and includes a side wall portion 122, a bottom wall portion 123 connected to a lower end of the side wall portion 122, and a flange portion 121 connected to an upper end of the side wall portion 122. The side wall portion 122 has, for example, a cylindrical tubular shape. The flange portion 121 extends outward from the upper end of the side wall portion 122. The contour of the flange portion 121 in the bottom container 120 has a substantially quadrangular shape that fits inside the lower tubular wall 104 in the housing body 100. For example, the flange portion 121 may be integrally fastened to the lower surface 102 in the housing body 100 using a screw or the like, or may be fixed thereto by a rivet or the like, in a state of being disposed inside the lower tubular wall 104. Here, the bottom container 120 may be bonded to the housing body 100 in a state where the sealant is applied between the lower surface 102 of the housing body 100 and an upper surface of the flange portion 121 in the bottom container 120. This can increase airtightness of the accommodating space 13 formed in the housing 10. Further, instead of the sealant or in combination with the sealant, an O-ring may be interposed between the lower surface 102 of the housing body 100 and the flange portion 121 of the bottom container 120 to increase the airtightness of the accommodating space 13.

Note that the above aspect regarding the shape of the bottom container 120 is an example, and other shapes may be adopted. Further, the cavity portion formed inside the bottom container 120 communicates with the housing body 100 positioned above, and forms a portion of the accommodating space 13. The bottom container 120 configured as described above can be formed from an appropriate metal member, such as stainless steel or aluminum, having excellent strength and durability, for example. However, a material for forming the bottom container 120 is not particularly limited. Further, the bottom container 120 may have a multilayer structure. For example, in the bottom container 120, an exterior portion facing the outside may be formed from an appropriate metal member, such as stainless steel or aluminum, having excellent strength and durability, and an interior portion facing the accommodating space 13 may be formed from an insulating member such as a synthetic resin. Of course, the entire bottom container 120 may be formed from an insulating member.

As described above, the housing 10 in the embodiment includes the housing body 100, the top holder 110, and the bottom container 120 that are integrally assembled, and the accommodating space 13 extending in the direction from the first end portion 11 to the second end portion 12 is formed inside the housing 10. The accommodating space 13 accommodates the igniter 20, the projectile 30, a cutoff portion 53 in the conductor piece 50, the first coolant material 60, and the second coolant material 70 that are described below in detail.

Igniter

Next, the igniter 20 will be described. The igniter 20 is an electric igniter that includes an ignition portion 21 with an ignition charge, and an igniter body 22 including a pair of conduction pins (not illustrated) connected to the ignition portion 21. The igniter body 22 is surrounded by an insulating resin, for example. Further, tip end sides of the pair of conduction pins in the igniter body 22 are exposed to the outside, and are connected to a power source when the breaker device 1 is used.

The igniter body 22 includes a body portion 221 having a substantially cylindrical shape and accommodated inside the small diameter cylinder portion 112 in the top holder 110, and a connector portion 222 positioned on the body portion 221. The igniter body 22 is fixed to the small diameter cylinder portion 112 by, for example, the body portion 221 being pressed to an inner circumferential surface of the small diameter cylinder portion 112. Further, a constricted portion having an outer circumferential surface recessed as compared with other locations is annularly formed along a circumferential direction of the body portion 221 at an axially intermediate portion of the body portion 221. An O-ring 223 is fitted into this constricted portion. The O-ring 223 is formed from, for example, rubber (silicone rubber, for example) or a synthetic resin, and functions to increase airtightness between the inner circumferential surface in the small diameter cylinder portion 112 and the body portion 221.

The connector portion 222 in the igniter 20 is disposed protruding to the outside through an opening 112A formed at an upper end of the small diameter cylinder portion 112. The connector portion 222 has, for example, a cylindrical tubular shape covering a side of the conduction pin, allowing connection with a connector of a power source.

As illustrated in FIG. 1, the ignition portion 21 of the igniter 20 is disposed facing the accommodating space 13 (more specifically, the cavity portion formed inside the large diameter cylinder portion 113) of the housing 10. The ignition portion 21 is configured as a form accommodating an ignition charge in an igniter cup, for example. For example, the ignition charge is accommodated in the igniter cup in the ignition portion 21 in a state of being in contact with a bridge wire (resistor) suspended coupling the base ends of the pair of conduction pins to each other. As the ignition charge, for example, zirconium-potassium perchlorate (ZPP), zirconium-tungsten-potassium perchlorate (ZWPP), titanium hydride-potassium perchlorate (THPP), lead tricinate, or the like may be adopted.

In actuation of the igniter 20, when an actuating current for igniting the ignition charge is supplied from the power source to the conduction pins, the bridge wire in the ignition portion 21 generates heat, and as a result, the ignition charge in the igniter cup is ignited and burns, generating a combustion gas. Then, the pressure in the igniter cup increases along with the combustion of the ignition charge in the igniter cup of the ignition portion 21, a rupture surface 21A of the igniter cup ruptures, and the combustion gas is discharged from the igniter cup into the accommodating space 13. More specifically, the combustion gas from the igniter cup is discharged into a recess 44 in a piston portion 41 described later of the projectile 30 disposed in the accommodating space 13.

Conductor Piece

Figure 2:
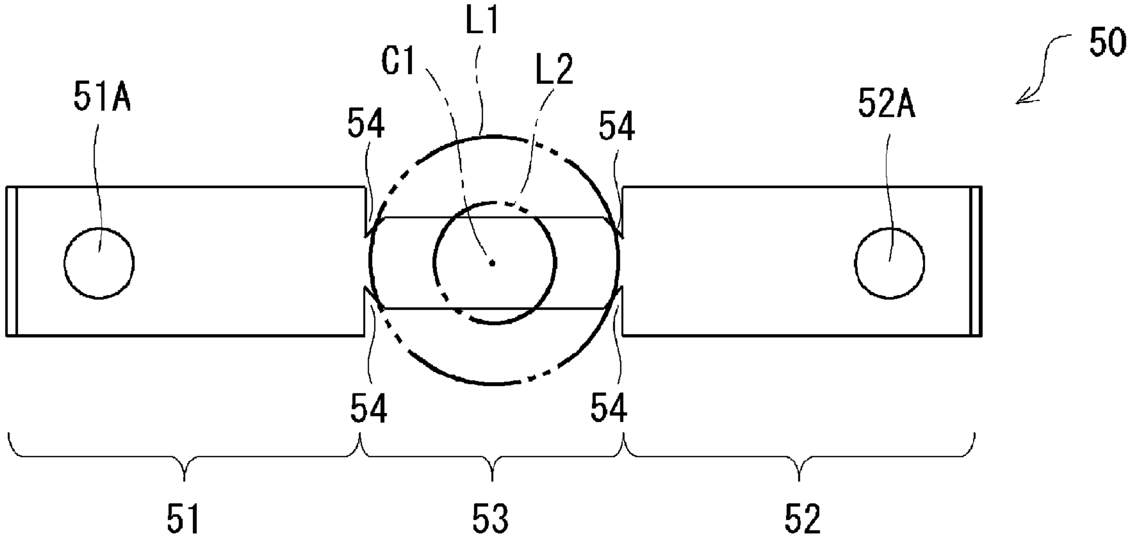
FIG. 2 is a top view of a conductor piece.

Next, the conductor piece 50 will be described. FIG. 2 is a top view of the conductor piece 50 according to the embodiment. The conductor piece 50 is a metal body having conductivity that constitutes a portion of the components of the breaker device 1 and, when the breaker device 1 is attached to a predetermined electric circuit, forms a portion of the electric circuit, and may be referred to as a bus bar. The conductor piece 50 can be formed from a metal such as copper (Cu), for example. However, the conductor piece 50 may be formed from a metal other than copper, or may be formed from an alloy of copper and another metal. Note that examples of metals other than copper included in the conductor piece 50 include manganese (Mn), nickel (Ni), and platinum (Pt).

In one aspect illustrated in FIG. 2, the conductor piece 50 is formed as an elongated flat plate piece as a whole, and includes a first connecting end portion 51 and a second connecting end portion 52 on both end sides, and the cutoff portion 53 positioned in an intermediate portion therebetween. Connection holes 51A, 52A are provided in the first connecting end portion 51 and the second connecting end portion 52 of the conductor piece 50, respectively. These connection holes 51A, 52A are used to connect with other conductors (lead wires, for example) in the electric circuit. Note that in FIG. 1, the connection holes 51A and 52A in the conductor piece 50 are not illustrated. The cutoff portion 53 of the conductor piece 50 is a portion forcibly and physically cut by the projectile 30 (first projectile 40) to be described later in detail and is cut off from the first connecting end portion 51 and the second connecting end portion 52 when an abnormality such as excessive current occurs in the electric circuit to which the breaker device 1 is applied.

Notches (slits) 54 are formed at both ends of the cutoff portion 53 of the conductor piece 50, making it easy to cut and cut off the cutoff portion 53.

Here, various forms of the conductor piece 50 can be adopted, and a shape thereof is not particularly limited. While, in the example illustrated in FIG. 2, surfaces of the first connecting end portion 51, the second connecting end portion 52, and the cutoff portion 53 form the same surface, the form is not limited thereto. For example, the conductor piece 50 may be connected such that the cutoff portion 53 is orthogonal to or inclined relative to the first connecting end portion 51 and the second connecting end portion 52. Further, the planar shape of the cutoff portion 53 of the conductor piece 50 is not particularly limited, either. Of course, the shapes of the first connecting end portion 51 and the second connecting end portion 52 of the conductor piece 50 are not particularly limited, either. Further, the notches 54 in the conductor piece 50 can be omitted as appropriate.

Here, a pair of conductor piece holding holes 105A and 105B are formed in the housing body 100 according to the embodiment. The pair of conductor piece holding holes 105A and 105B extend in a transverse cross-sectional direction orthogonal to the vertical direction (axial direction) of the housing body 100. More specifically, the pair of conductor piece holding holes 105A and 105B extend in a straight line with the cavity portion (accommodating space 13) of the housing body 100 interposed therebetween. The conductor piece 50 configured as described above is held in the housing body 100 in a state of being inserted through the pair of conductor piece holding holes 105A and 105B formed in the housing body 100. In the example illustrated in FIG. 1, the first connecting end portion 51 of the conductor piece 50 is held in a state of being inserted through the conductor piece holding hole 105A, and the second connecting end portion 52 is held in a state of being inserted through the conductor piece holding hole 105B. In this state, the cutoff portion 53 of the conductor piece 50 is positioned in the cavity portion (accommodating space 13) of the housing body 100. As described above, the conductor piece 50 attached to the housing body 100 is held orthogonally to the extending direction (axial direction) of the accommodating space 13 with the cutoff portion 53 crossing the accommodating space 13. Note that reference sign L1 illustrated in FIG. 2 denotes an outer circumferential position of the rod portion 42 positioned above the conductor piece 50 in a state of being attached to the housing body 100 of the breaker device 1. In the present embodiment, the conductor piece 50 is installed with the outer circumferential position L1 of the rod portion 42 substantially overlapping the positions of the notches 54 positioned at both ends of the cutoff portion 53. In the present embodiment, for example, since a transverse cross-sectional area of the accommodating space 13 is larger than a transverse cross-sectional area of the cutoff portion 53, a gap is formed on the side of the cutoff portion 53.

Coolant Material Next, a coolant material 60 disposed in the accommodating space 13 in the housing 10 will be described. Here, as illustrated in FIG. 1, prior to actuation of the breaker device 1 (igniter 20), the cutoff portion 53 of the conductor piece 50 in a state of being held in the pair of conductor piece holding holes 105A and 105B in the housing body 100 is horizontally laid crossing the accommodating space 13 of the housing 10. Hereinafter, within the accommodating space 13 of the housing 10 separated by the cutoff portion 53 of the conductor piece 50, a region (space) in which the projectile 30 is disposed is referred to as a "projectile initial arrangement region R1", and a region (space) positioned on the opposite side of the projectile 30 is referred to as an "arc-extinguishing region R2". Note that in the present embodiment, the transverse cross-sectional area of the accommodating space 13 is larger than the transverse cross-sectional area of the cutoff portion 53, and a gap is formed on the side of the cutoff portion 53. Therefore, the projectile initial arrangement region R1 and the arc-extinguishing region R2 in the accommodating space 13 are not completely isolated from each other by the cutoff portion 53, but communicate with each other via the gap. Of course, depending on the shape and size of the cutoff portion 53, the projectile initial arrangement region R1 and the arc-extinguishing region R2 may be completely isolated from each other by the cutoff portion 53.

The arc-extinguishing region R2 of the accommodating space 13 is a region (space) for receiving the cutoff portion 53 cut off by the projectile 30 projected during actuation of the breaker device 1 (igniter 20). In this arc-extinguishing region R2, the coolant material 60 as an arc-extinguishing material is disposed. The coolant material 60 is a coolant material for removing thermal energy of the arc generated and the cutoff portion 53 when the projectile 30 cuts off the cutoff portion 53 of the conductor piece 50, and cools the arc and the cutoff portion 53, thereby suppressing arc generation during cutting off of a current or thereby extinguishing (eliminating) the generated arc.

The arc-extinguishing region R2 of the breaker device 1 has significance as a space for receiving the cutoff portion 53 cut off from the first connecting end portion 51 and the second connecting end portion 52 of the conductor piece 50 and, at the same time, as a space for effectively extinguishing the arc generated when the cutoff portion 53 is cut off. Then, in order to effectively extinguish the arc generated when the cutoff portion 53 is cut off from the conductor piece 50, the coolant material 60 is disposed as an arc-extinguishing material in the arc-extinguishing region R2. As one aspect of the embodiment, the coolant material 60 is solid. The coolant material 60 is formed into a substantially disk shape, for example, and is disposed at a bottom portion of the bottom container 120. For example, the coolant material 60 may be formed by forming a braided metal fiber into a desired shape. Examples of the metal fiber forming the coolant material 60 include an aspect in which at least any one of steel wool or copper wool is included. However, the above aspects in the coolant material 60 are examples, and the coolant material 60 is not limited to the above aspects. For example, the coolant material 60 may be powdered or granular, or may be prepared by compression-forming powder or granules. The coolant material 60 may be liquid or gel-like instead of being solid.

Projectile

Figure 3:
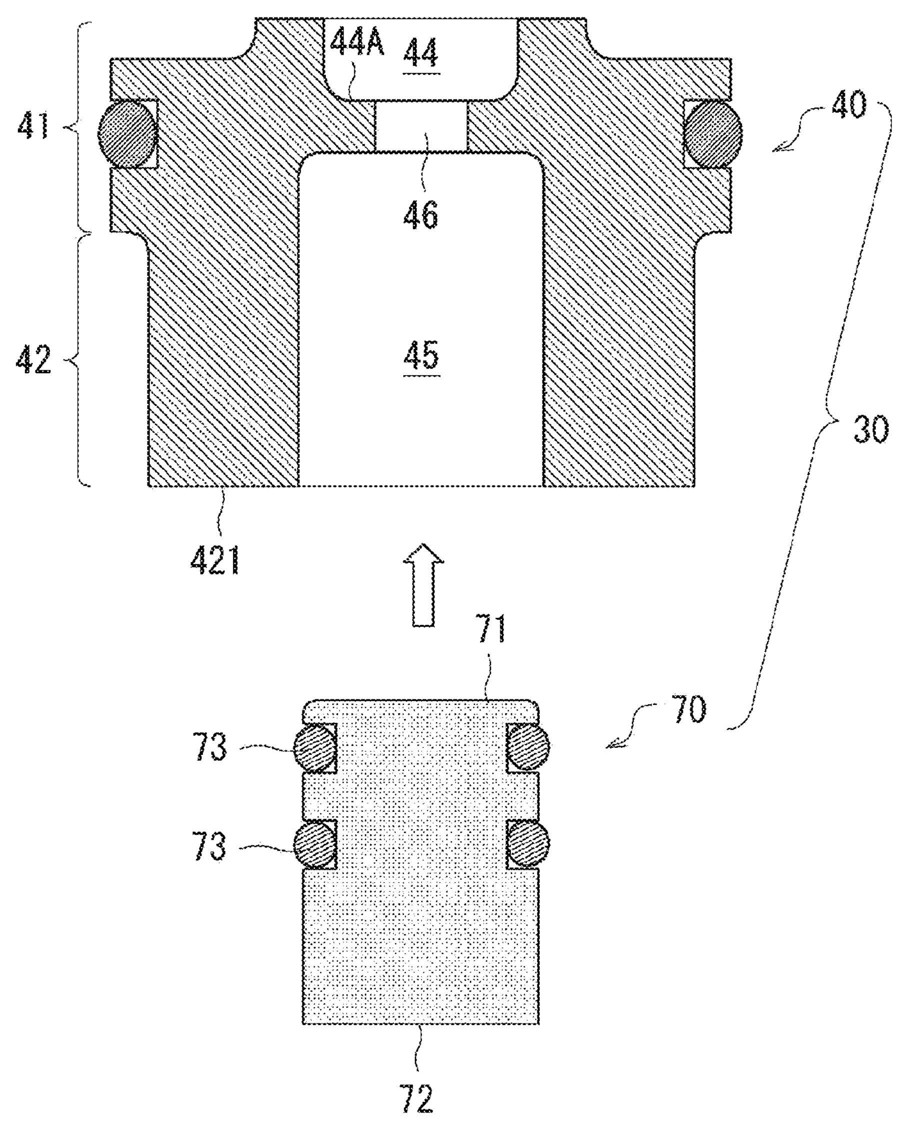
FIG. 3 is an exploded view of a projectile 30.

Next, the projectile 30 will be described. The projectile 30 includes the first projectile 40 and a second projectile 70. FIG. 3 is an exploded view of the projectile 30, illustrating the first projectile 40 and the second projectile 70 in a state of being separated from each other. The first projectile 40 and the second projectile 70 are formed from an insulating member such as synthetic resin, for example. Further, as illustrated in FIG. 3, the second projectile 70 is smaller in size than the first projectile 40.

First, the projectile 30 will be described with reference to FIGS. 1 and 3. The first projectile 40 includes the piston portion 41 and the rod portion 42 connected to the piston portion 41. The piston portion 41 has a substantially cylindrical shape and has an outer diameter substantially corresponding to an inner diameter of the large diameter cylinder portion 113 in the top holder 110. For example, the diameter of the piston portion 41 may be slightly smaller than the inner diameter of the large diameter cylinder portion 113. The shape of the piston portion 41 can be changed as appropriate according to the shape of the large diameter cylinder portion 113 and the like.

The rod portion 42 of the first projectile 40 is a rod-shaped member having an outer circumferential surface smaller in diameter than the piston portion 41, for example, and is integrally connected to a lower end side of the piston portion 41. A lower end surface of the rod portion 42 is formed as a cutoff surface 421 for cutting off the cutoff portion 53 from the conductor piece 50 during actuation of the breaker device 1. The cutoff surface 421 of the first projectile 40 is disposed facing the cutoff portion 53 in a state where the first projectile 40 is disposed at an initial position illustrated in FIG. 1. Here, the rod portion 42 in the present embodiment has a substantially cylindrical shape, but the shape thereof is not particularly limited. Note that, in the initial position illustrated in FIG. 1, a region on a tip end side including the cutoff surface 421 in the rod portion 42 of the first projectile 40 is positioned in the cavity portion (forming a portion of the accommodating space 13) of the housing body 100. The diameter of the rod portion 42 is slightly smaller than the inner diameter of an inner circumferential surface of the housing body 100, for example. The outer circumferential surface of the rod portion 42 is guided along the inner circumferential surface of the housing body 100 during actuation of the breaker device 1.

Further, a recess 44, which is a recessed portion having a cylindrical shape, for example, is formed on an upper surface of the piston portion 41 in the first projectile 40. The recess 44 is configured to receive the ignition portion 21. A bottom surface of the recess 44 is formed as a first pressure receiving portion 44A that receives energy received from the igniter 20 during actuation of the igniter 20. Further, a constricted portion having an outer circumferential surface recessed as compared with other locations is annularly formed along a circumferential direction of the piston portion 41 at an axially intermediate portion of the piston portion 41. An O-ring 43 is fitted into this constricted portion. The O-ring 43 is formed from, for example, rubber (silicone rubber, for example) or a synthetic resin, and functions to increase airtightness between an inner circumferential surface in the large diameter cylinder portion 113 and the piston portion 41.

An attachment recessed portion 45 for accommodating and attaching the second projectile 70 is provided on a lower end side of the first projectile 40. This attachment recessed portion 45 is formed in an aspect in which the attachment recessed portion 45 opens in the cutoff surface 421 of the rod portion 42 in the first projectile 40. In the example illustrated in FIGS. 1 and 3, the attachment recessed portion 45 has a cylindrical shape. The recess 44 and the attachment recessed portion 45 of the first projectile 40 are coaxially disposed and extend through a center axis of the first projectile 40. Furthermore, as illustrated in FIGS. 1 and 3, a communication path 46 that connects the recess 44 and the attachment recessed portion 45 to each other (allows communication between the recess 44 and the attachment recessed portion 45) is provided in the first projectile 40. The communication path 46 of the first projectile 40 is formed extending through the center axis of the first projectile 40. The communication path 46 is also disposed coaxially with both the recess 44 and the attachment recessed portion 45.

Next, the second projectile 70 will be described. The second projectile 70 is so shaped and sized as to be accommodatable in the attachment recessed portion 45 of the first projectile 40, and is configured as a cylindrical piston form in the present embodiment. Further, as illustrated in FIG. 3, the second projectile 70 according to the present embodiment is smaller in size than the first projectile 40 and is smaller in transverse cross-sectional area than the first projectile 40. For example, the diameter of the second projectile 70 may be slightly smaller than the diameter of the attachment recessed portion 45 in the first projectile 40. Further, a constricted portion having an outer circumferential surface recessed as compared with other locations is annularly formed along a circumferential direction of the second projectile 70 at an axially intermediate portion of the second projectile 70. An O-ring 73 is fitted into this constricted portion. The O-ring 73 is formed from, for example, rubber (silicone rubber, for example) or a synthetic resin. In the example illustrated in FIGS. 1 and 3, the O-ring 73 is disposed at two steps on the outer circumferential surface of the second projectile 70, but the number of steps of the O-ring 73 is not particularly limited.

An upper surface of the second projectile 70 is formed as a second pressure receiving portion 71 that receives energy received from the igniter 20 during actuation of the breaker device 1 (igniter 20). Further, a lower surface of the second projectile 70 is formed as a pressing portion 72 for pressing the cutoff portion 53 cut off by the first projectile 40 into the arc-extinguishing region R2 during actuation of the breaker device 1 (igniter 20). Here, when the second projectile 70 is attached to the first projectile 40, the second projectile 70 is inserted into the attachment recessed portion of the first projectile 40 from the second pressure receiving portion 71 (upper surface) side. As a result, as illustrated in FIG. 1, the second projectile 70 is attached to the first projectile 40 with the second pressure receiving portion 71 in the second projectile 70 facing the communication path 46 and the recess 44 in the first projectile and the pressing portion 72 disposed on an open end 45A side of the attachment recessed portion 45. In the present embodiment, the second projectile 70 is disposed coaxially with the first projectile 40 in a state of being attached to the attachment recessed portion 45. However, the second projectile 70 may be decentered with respect to the first projectile 40 in a state where the second projectile 70 is attached to the first projectile 40.

Further, for example, when the second projectile 70 is attached to the attachment recessed portion 45 of the first projectile 40, an O-ring 73 may be compressed and deformed by being sandwiched between an inner circumferential surface of the attachment recessed portion 45 and the outer circumferential surface of the second projectile 70. Then, a repulsive force of the O-ring 73 in the compressed and deformed state may exert a holding force for suppressing falling off of the second projectile 70 from the attachment recessed portion 45 due to its own weight. Further, in the present embodiment, an axial depth of the attachment recessed portion 45 in the first projectile 40 is slightly larger than an axial length of the second projectile 70. Further, the axial depth of the attachment recessed portion 45 in the first projectile 40 may be equal in dimension to the axial length of the second projectile 70. This enables the second projectile 70 to be accommodated in the attachment recessed portion 45 without a lower end portion including the pressing portion 72 of the second projectile 70 protruding from the open end 45A of the attachment recessed portion 45 in the first projectile 40.

In the pre-actuation initial state illustrated in FIG. 1, the projectile 30 configured as described above is disposed in the projectile initial arrangement region R1 of the accommodating space 13 in a state where the second projectile 70 is attached to the attachment recessed portion 45 of the first projectile 40. In the example illustrated in FIG. 1, the piston portion 41 of the first projectile 40 is positioned on the first end portion 11 side (upper end side) in the accommodating space 13. Further, the rod portion 42 of the first projectile 40 is disposed in a state where the cutoff surface 421 is placed on the conductor piece 50. Here, reference sign L1 illustrated in FIG. 2 indicates an outer circumferential position of the rod portion 42 in the first projectile positioned on the conductor piece 50 in a state of being attached to the housing body 100 of the breaker device 1. In the pre-actuation initial state of the breaker device 1, the outer circumferential position L1 of the rod portion 42 in the first projectile 40 substantially overlaps the positions of the notches 54 positioned at both ends of the cutoff portion 53.

Further, reference sign L2 illustrated in FIG. 2 indicates an outer circumferential position of the second projectile 70 attached to the first projectile 40. As illustrated in FIG. 2, in the pre-actuation initial state of the breaker device 1, the second projectile 70 in the state of being attached to the first projectile 40 is provided with at least a portion of a planar region surrounded by the outer circumferential position L2 overlapping at least a portion of a planar region of the cutoff portion 53. More specifically, prior to actuation of the igniter 20, the second projectile 70 is attached to the first projectile 40 with its center axis Cl extending through or near a center position of the cutoff portion 53. Further, in the present embodiment, the axial depth of the attachment recessed portion 45 in the first projectile 40 is slightly larger than the axial length of the second projectile 70. Therefore, in the pre-actuation initial state of the breaker device 1, the pressing portion 72 of the second projectile 70 is disposed slightly retracted from the cutoff surface 421 of the first projectile 40 with the cutoff portion 53 as a reference. As a result, a gap is formed between the pressing portion 72 and the cutoff portion 53.

Operation

Figure 4A:
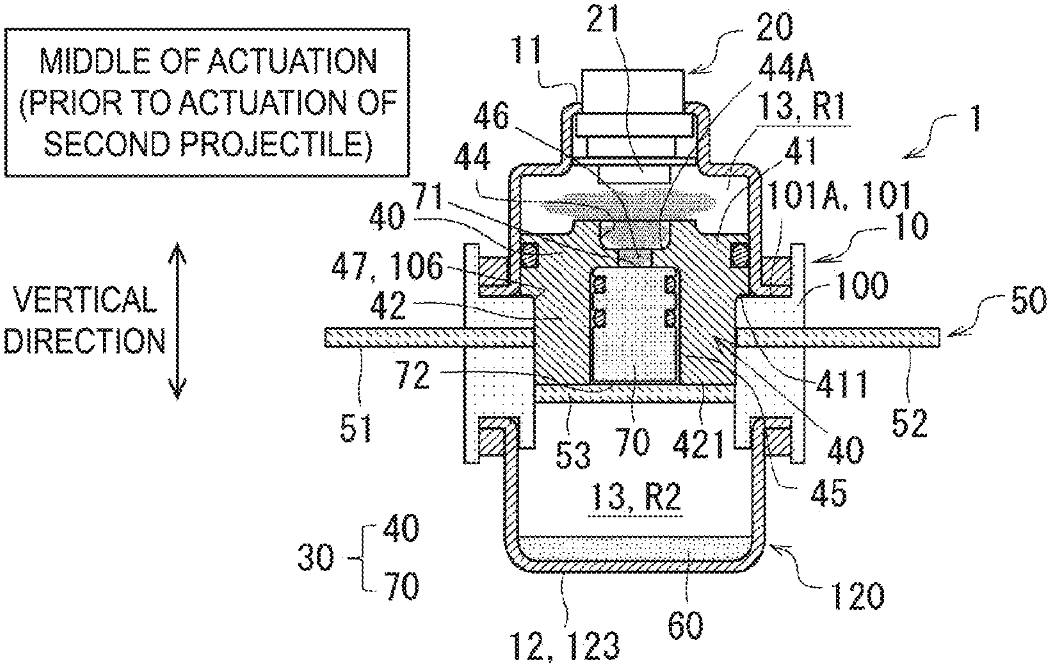
FIG. 4A is a view illustrating a middle of actuation situation of the breaker device.
Figure 4B:
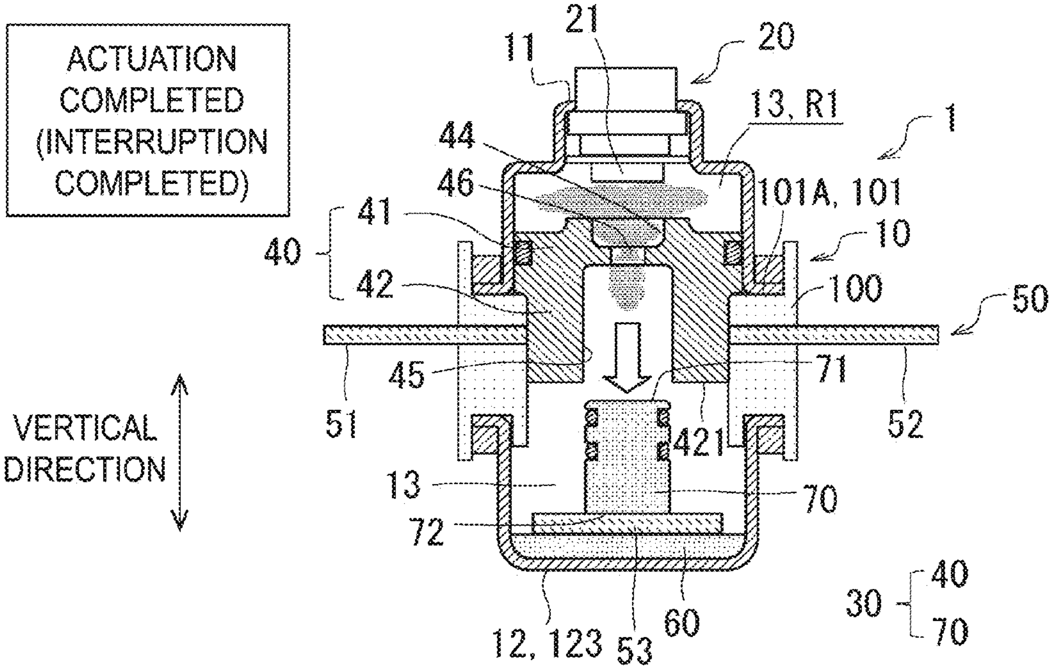
FIG. 4B is a view illustrating an actuation completed situation of the breaker device.

Next, operation content when the breaker device 1 is actuated to interrupt the electric circuit will be described. FIGS. 4A and 4B are views illustrating an actuation situation of the breaker device 1 according to the embodiment. FIG. 4A illustrates a situation in the middle of actuation of the breaker device 1, and FIG. 4B illustrates a situation in which the actuation of the breaker device 1 is completed. Hereinafter, the operation content of the breaker device 1 during actuation will be described with reference to FIGS. 3, 4A, and 4B.

The breaker device 1 according to the present embodiment further includes an abnormality detection sensor (not illustrated) configured to detect an abnormal current of the electric circuit, and a control unit (not illustrated) configured to control the actuation of the igniter 20. In addition to the current flowing through the conductor piece 50, the abnormality detection sensor may be capable of detecting a voltage and a temperature of the conductor piece 50. Further, the control unit of the breaker device 1 is a computer capable of performing a predetermined function by executing a predetermined control program, for example. The predetermined function of the control unit may be realized by corresponding hardware. Then, when excessive current flows through the conductor piece 50 forming a portion of the electric circuit to which the breaker device 1 is applied, the abnormal current is detected by the abnormality detection sensor. Abnormality information regarding the detected abnormal current is passed from the abnormality detection sensor to the control unit. For example, the control unit is energized from an external power source (not illustrated) connected to the conduction pin of the igniter 20 and actuates the igniter based on the current value detected by the abnormality detection sensor. Here, the abnormal current may be a current value that exceeds a predetermined threshold value set for protection of a predetermined electric circuit. Note that the abnormality detection sensor and the control unit described above need not be included in the components of the breaker device 1, and may be included in a device separate from the breaker device 1, for example. Further, the abnormality detection sensor and the control unit are not essential components of the breaker device 1.

For example, when an abnormal current of the electric circuit is detected by an abnormality detection sensor that detects an abnormal current of the electric circuit, the control unit of the breaker device 1 actuates the igniter 20. That is, an actuating current is supplied from the external power source (not illustrated) to the conduction pin of the igniter 20, and as a result, the ignition charge in the ignition portion 21 is ignited and burns, generating a combustion gas. Then, the rupture surface 21A ruptures due to rise in pressure in the ignition portion 21, and the combustion gas of the ignition charge is discharged from the inside of the ignition portion 21 into the accommodating space 13.

As described above, the projectile 30 in the breaker device 1 includes the first projectile 40 and the second projectile 70. The projectile 30 is configured to be projected from the initial position by receiving energy received from the igniter 20 during actuation, more specifically, energy of the combustion gas generated by combustion of the ignition charge in the ignition portion 21, and is movable along the accommodating space 13. The first projectile 40 and the second projectile 70 in the projectile 30 have functions (roles) different from each other. Specifically, during actuation of the breaker device 1 (igniter 20), the first projectile 40 is projected toward the second end portion 12 side in the accommodating space 13 by the energy received from the combustion gas of the ignition charge in the igniter 20, thereby functioning to cut off the cutoff portion 53 from the conductor piece 50. On the other hand, during actuation of the breaker device 1 (igniter 20), the second projectile 70 is projected toward the second end portion 12 side in the accommodating space 13 by the energy received from the combustion gas of the ignition charge in the igniter 20, thereby functioning to press, into the arc-extinguishing region R2, the cutoff portion 53 cut off by the first projectile 40. Hereinafter, the operation content of the first projectile 40 and the second projectile 70 during actuation of the breaker device 1 (igniter 20) will be described in detail.

As illustrated in FIG. 1, the ignition portion 21 of the igniter 20 is received in the recess 44 of the piston portion 41 of the first projectile 40, and the rupture surface 21A of the ignition portion 21 is disposed facing the first pressure receiving portion 44A of the recess 44 in the first projectile 40. Therefore, the combustion gas from the ignition portion 21 is discharged toward the recess 44 of the first projectile 40, and the pressure (combustion energy) of the combustion gas is transmitted to the upper surface of the piston portion 41 including a first pressure receiving surface 44A. Due to this, the upper surface of the piston portion 41 including the first pressure receiving surface 44A in the first projectile 40 is pressed, and the first projectile 40 is vigorously biased downward (toward the second end portion 12 side). As a result, the cutoff surface 421 formed on a lower end side of the rod portion 42 in the first projectile 40 is strongly pressed against the boundary portions (the portions where the notches 54 are formed) between the first connecting end portion 51 and the cutoff portion 53 and between the second connecting end portion 52 and the cutoff portion 53 of the conductor piece 50. In this manner, for example, the cutoff portion 53 of the conductor piece 50 is pressingly cut by shearing, whereby the cutoff portion 53 can be cut off from the conductor piece 50.

As illustrated in FIG. 4A, the first projectile 40 moves downward (toward the second end portion 12 side) in the extending direction (axial direction) of the accommodating space 13 by a predetermined stroke until a lower end surface 411 of the piston portion 41 abuts (collides with) the upper surface 101 of the housing body 100. A state where the lower end surface 411 of the piston portion 41 abuts (collides with) a stopper portion 101A on the upper surface 101 of the housing body 100 in this manner and thereby restricts the first projectile 40 from moving further downward (toward the second end portion 12 side) is referred to as the "movement restriction state". As illustrated in FIG. 4A, in the breaker device 1 according to the present embodiment, the length of the rod portion 42 or the dimension in the vertical direction of the arc-extinguishing region R2 is set so that the cutoff surface 421 of the rod portion 42 is positioned in a relatively upper region of the arc-extinguishing region R2 when the first projectile 40 is projected from the initial position during actuation and is brought into the movement restriction state.

Note that a holding portion for holding the lower end surface 411 of the piston portion 41 in a state of abutting the stopper portion 101A when the lower end surface 411 of the piston portion 41 in the first projectile 40 collides with the stopper portion 101A during actuation of the breaker device 1 may be provided on at least any one of the lower end surface 411 of the piston portion 41 or the stopper portion 101A. Such a holding portion is not particularly limited. For example, the holding portion may be formed by a protrusion provided on the lower end surface 411 of the piston portion 41 or the stopper portion 101A. For example, when the lower end surface 411 of the piston portion 41 collides with the stopper portion 101A, a protrusion provided on the lower end surface 411 of the piston portion 41 pierces the stopper portion 101A, or a protrusion provided on the stopper portion 101A pierces the lower end surface 411 of the piston portion 41, whereby the lower end surface 411 of the piston portion 41 can be held in a state of abutting the stopper portion 101A. Alternatively, the holding portion may be formed not by actively providing the protrusion as described above, but by engagement between a round internal corner portion 47 formed at a boundary portion between the lower end surface 411 of the piston portion 41 and the outer circumferential surface of the rod portion 42 as illustrated in FIG. 1, and a right angle external corner portion 106 formed by the stopper portion 101A (upper surface 101) and the inner circumferential surface of the housing body 100 connected at a right angle. In this case, when the lower end surface 411 of the piston portion 41 collides with the stopper portion 101A during actuation of the breaker device 1, the lower end surface 411 of the piston portion 41 may be held in a state of abutting the stopper portion 101A, with the right angle external corner portion 106 biting (piercing) the round internal corner portion 47 to be engaged therewith.

Next, the operation of the second projectile 70 during actuation of the breaker device 1 (igniter 20) will be described. As described above, in the pre-actuation initial state of the breaker device 1, the second projectile 70 is attached to the attachment recessed portion 45 of the first projectile 40. As described above, the recess 44 and the attachment recessed portion 45 in the first projectile 40 communicate with each other via the communication path 46, and the second pressure receiving portion 71 of the second projectile 70 in the state of being attached to the first projectile 40 is disposed facing the lower end of the communication path 46. Therefore, a portion of the combustion gas from the ignition portion 21 discharged toward the recess 44 of the first projectile 40 during actuation of the breaker device 1 (igniter 20) is guided to the second pressure receiving portion 71 of the second projectile 70 through the communication path 46, and as a result, the pressure (combustion energy) of the combustion gas is transmitted to the second pressure receiving portion 71 of the second projectile 70. Due to this, the second pressure receiving portion 71 of the second projectile 70 attached (accommodated) in the attachment recessed portion 45 of the first projectile 40 is pressed, and the second projectile 70 is vigorously biased downward (toward the second end portion 12 side). As a result, the second projectile 70 stored in the attachment recessed portion 45 of the first projectile 40 protrudes downward from the open end 45A of the attachment recessed portion 45 and is projected. Due to this, the cutoff portion 53 cut off from the conductor piece 50 by the rod portion 42 of the first projectile 40 as illustrated in FIG. 4A is pressed downward by the pressing portion 72 of the second projectile 70 projected from the first projectile 40, whereby the cutoff portion 53 can be pressed into a bottom portion side (that is, the second end portion 12 side) of the arc-extinguishing region R2 as illustrated in FIG. 4B.

As described above, the projectile 30 of the breaker device 1 according to the present embodiment includes the first projectile 40 and the second projectile 70, which are projected in two steps by receiving energy of the combustion gas generated by the burning of the ignition charge of the ignition portion 21 during actuation of the igniter 20. That is, when the first projectile 40, which is projected by the energy received from the combustion gas of the ignition charge during actuation of the igniter 20, is pressed down toward the second end portion 12 side of the accommodating space 13, the cutoff portion 53 is pressingly cut by the cutoff surface 421, whereby the cutoff portion 53 can be cut off from the conductor piece 50. As a result, the first connecting end portion 51 and the second connecting end portion 52 positioned at both ends of the conductor piece 50 are electrically disconnected, and the predetermined electric circuit to which the breaker device 1 is applied can be forcibly interrupted.

Then, similarly to the first projectile 40, the second projectile 70 is projected from the first projectile 40 toward the second end portion 12 side by the energy received from the combustion gas of the ignition charge generated during actuation of the igniter 20. Due to this, the cutoff portion 53 can be separated from the cutoff surface 421 of the first projectile 40, for example, by the pressing portion 72 of the second projectile 70, and the cutoff portion 53 can be swiftly pressed into the bottom portion side (second end portion 12 side) of the arc-extinguishing region R2. As a result, the cutoff portion 53 pressed into the bottom portion side of the arc-extinguishing region R2 by the second projectile 70 is rapidly cooled by the coolant material 60 disposed in the arc-extinguishing region R2, whereby the arc generated when the cutoff portion 53 is cut off from the first connecting end portion 51 and the second connecting end portion 52 can be quickly extinguished. As a result, it is possible to quickly interrupt the electric circuit to which the breaker device 1 is applied in a case where an abnormality is detected in the electric circuit, or the like. That is, by effectively suppressing a prolonged extinguishing of the arc generated when the electric circuit is interrupted, it is possible to suppress a prolonged interruption of the electric circuit. Further, according to the breaker device 1, it is possible to suitably suppress the generation of a large spark or flame or the generation of a loud impact sound when the electric circuit is interrupted. Further, damage to the housing 10 and the like of the breaker device 1 caused by these can also be suppressed.

As described above, according to the breaker device 1, separately from the first projectile 40 for cutting off the cutoff portion 53 from the conductor piece 50 during actuation of the igniter 20, there is included the second projectile 70, which is projected from the first projectile 40 to press the cutoff portion 53 cut off by the first projectile 40 into the bottom portion side (second end portion 12 side) of the arc-extinguishing region R2. By adopting such a two-step mechanism in the projectile 30, even if an axial length of the rod portion 42 in the first projectile 40 is designed to be short, the second projectile 70 can separate the cutoff portion 53 from the cutoff surface 421 of the first projectile 40 and press the cutoff portion 53 into the bottom portion side (second end portion 12 side) of the arc-extinguishing region R2. Due to this, the cutoff portion 53 after being cut off can be swiftly moved away from the first connecting end portion 51 and the second connecting end portion 52 in the conductor piece 50, the arc when the electric circuit is interrupted can be reduced, and the insulation performance thereof can be improved.

On the other hand, in the known breaker device without the two-step projection mechanism of the projectile, in order to increase the distance between the conductor piece and the cut portion, a movement stroke of the projectile corresponding to the distance by which the cut portion should be separated from the conductor piece is normally required, and therefore, the axial length of the projectile has to be increased in accordance with the movement stroke. On the other hand, it is sufficient for the axial length of the rod portion 42 in the first projectile 40 according to the present embodiment to have a length sufficient for cutting off the cutoff portion 53 by the rod portion 42 during actuation of the igniter 20, and it is not necessary to press the cutoff portion 53 by the rod portion 42 into the bottom portion side of the arc-extinguishing region R2. For example, the axial length of the rod portion 42 in the first projectile 40 is only required to be set to such a length that when the piston portion 41 is brought into the movement restriction state during actuation of the igniter 20, the position of the cutoff surface 421 is positioned lower than the position of the lower surface (the surface facing the arc-extinguishing region R2) of the cutoff portion 53 in the pre-actuation initial state. Due to this, while the axial length of the rod portion 42 in the first projectile 40 is shortened, the cutoff portion 53 can be cut off at the time of projection, and the cutoff portion 53 after being cut off can be swiftly separated away from the first connecting end portion 51 and the second connecting end portion 52. Thus, being able to shorten the axial length of the rod portion 42 and, by extension, the axial length of the first projectile 40 has the following advantages.

That is, in the pre-actuation initial state of the breaker device 1, as illustrated in FIG. 1, the projectile 1 is disposed in the projectile initial arrangement region R1, that is, above the cutoff portion 53 of the conductor piece 50 in the accommodating space 13. Therefore, as the axial length of the first projectile 40 increases, it is necessary to increase the axial length of the projectile initial arrangement region R1, and it is necessary to increase the height dimension of the housing 10. On the other hand, according to the breaker device 1 of the present embodiment, since the axial length of the first projectile 40 (rod portion 42) can be shortened, the height dimension of the housing 10 can be reduced. As described above, according to the breaker device 1 of the present embodiment, it is possible to obtain an effect of improving the insulation performance (an effect of reducing the arc) when the electric circuit is interrupted while achieving downsizing of the entire housing 10.

Note that in the breaker device 1, the timing at which the second projectile 70 is projected from the first projectile 40 during actuation of the igniter 20 is not particularly limited. For example, the second projectile 70 may be projected from the first projectile 40 at the moment when the cutoff portion 53 is removed by the cutoff surface 421 of the first projectile 40, or, as illustrated in FIG. 4A, the second projectile 70 may be projected from the first projectile 40 at a timing after the movement restriction state is reached where the lower end surface 411 of the piston portion 41 abuts (collides with) the stopper portion 101A of the housing body 100. Alternatively, the second projectile 70 may be projected from the first projectile 40, after the first projectile 40 removes the cutoff portion 53 during actuation of the igniter 20, at a timing in the process (middle) of the movement restriction state being reached.

Furthermore, according to the breaker device 1, as described above, the second projectile 70 is configured to be attached to the first projectile 40 prior to actuation of the igniter 20 (pre-actuation initial state) and projected from the first projectile 40 by the energy received from the igniter 20. Due to this, it is possible to adopt, for the second projectile 70, a reasonable arrangement aspect suitable for separating, from the cutoff surface 421 of the first projectile 40, the cutoff portion 53 after being cut off and pressing the cutoff portion 53 into the bottom portion side (second end portion 12 side) of the arc-extinguishing region R2.

Furthermore, in the present embodiment, since the second projectile 70 is configured as a projectile having a smaller transverse cross-sectional area than that of the first projectile 40, it is possible to adopt an aspect suitable for attaching the second projectile 70 to the first projectile 40 in the pre-actuation initial state of the breaker device 1. Further, since the second projectile 70 is smaller in size than the first projectile 40, it is possible to reduce an impact when the cutoff portion 53 cut off during actuation of the breaker device 1 collides with the bottom wall portion 123 of the bottom container 120. Therefore, even if the thickness of the bottom wall portion 123 in the bottom container 120 is reduced, deformation, damage, and the like of the bottom wall portion 123 can be suppressed. However, the aspect of the second projectile 70 is not particularly limited as long as it is possible to press, into the arc-extinguishing region R2, the cutoff portion 53 cut off by the first projectile 40 during actuation of the igniter 20. For example, the second projectile 70 may be disposed in a state of being spaced apart from the first projectile 40 without being attached to the first projectile 40 in the pre-actuation initial state. Further, it is not necessary for the second projectile 70 to be smaller in size than the first projectile 40. The second projectile 70 may have a size equal to that of the first projectile 40, or the second projectile 70 may be larger in size than the first projectile 40.

Further, according to the breaker device 1, the second projectile 70 is attached to the first projectile 40 with the second projectile 70 positioned coaxially with the first projectile 40. Due to this, when the second projectile 70 is projected from the first projectile 40, the second projectile 70 can press, in a well-balanced manner, the cutoff portion 53 cut off by the first projectile 40 into the bottom portion side (second end portion 12 side) of the arc-extinguishing region R2. In particular, in the present embodiment, prior to actuation of the igniter 20, the second projectile 70 is attached to the first projectile 40 with the center axis Cl of the second projectile 70 extending through or near the planar center portion of the cutoff portion 53. Due to this, when the second projectile 70 is projected from the first projectile 40, the second projectile 70 can press the cutoff portion 53 cut off by the first projectile 40 at or near the planar center portion of the cutoff portion 53, whereby the cutoff portion 53 can be smoothly pressed into the bottom portion side (second end portion 12 side) of the arc-extinguishing region R2. Note that as the second projectile 70 is attached to the first projectile 40 with the center axis Cl of the second projectile 70 extending through the planar center portion of the cutoff portion 53, the cutoff portion 53 cut off by the first projectile 40 during actuation of the igniter 20 can be further smoothly pressed into the bottom portion side (second end portion 12 side) of the arc-extinguishing region R2 by the second projectile 70.

Further, the first projectile 40 in the present embodiment includes the cutoff surface 421 disposed facing the cutoff portion 53 prior to actuation of the igniter 20 and configured to cut off the cutoff portion 53, the attachment recessed portion 45 opening in the cutoff surface 421 and configured to be attached with the second projectile 70, and the communication path 46 through which the energy received from the igniter 20 is guided to the second pressure receiving portion 71 of the second projectile 70 attached to the attachment recessed portion 45. Due to this, the combustion gas generated during actuation of the igniter 20 can be suitably introduced via the communication path 46 into the second pressure receiving portion 71 of the second projectile 70 attached to the attachment recessed portion 45 of the first projectile 40. Then, the second projectile 70 can be smoothly projected from the first projectile 40 by the pressure (combustion energy) of the combustion gas introduced into the second pressure receiving portion 71.

Figure 5:
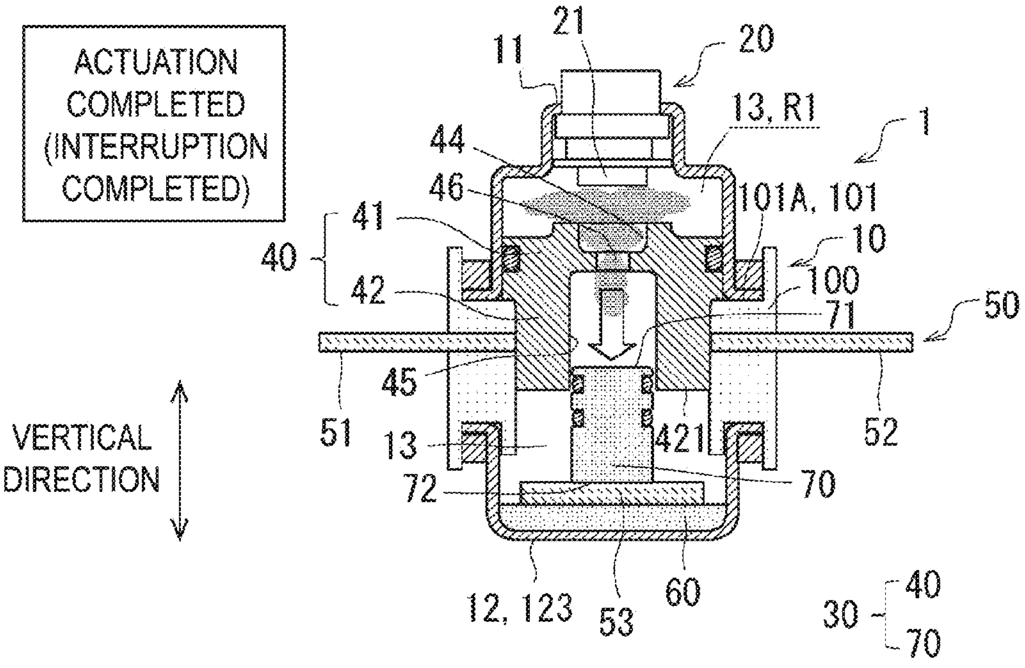
FIG. 5 is a view illustrating a modification of the breaker device.

Note that in the above embodiment, in the example illustrated in FIG. 4, an aspect in which the second projectile 70 is projected to be completely separated from the first projectile 40 during actuation of the breaker device 1 has been described as an example. However, the present disclosure is not limited to this aspect. For example, as in the modification illustrated in FIG. 5, it is possible to adopt specifications in which a portion of the second projectile 70 projected from the first projectile 40 during actuation of the breaker device 1 remains in the attachment recessed portion 45 in the first projectile 40. FIG. 5 illustrates a situation in which the actuation of the breaker device 1 according to the modification is completed.

While the embodiment of the electric circuit breaker device according to the present disclosure has been described above, each of the aspects disclosed in the present specification can be combined with any other feature disclosed in the present specification.

REFERENCE SIGNS LIST

1 Breaker device
10 Housing
13 Accommodating space
20 Igniter
30 Projectile
40 First projectile
50 Conductor piece
53 Cutoff portion
60 Coolant material
70 Second projectile

The invention claimed is:

1. An electric circuit breaker device comprising:

an igniter provided on a housing;

a projectile disposed in an accommodating space, the accommodating space being formed in the housing and extending in one direction, the projectile being configured to be projected along the accommodating space by energy received from the igniter;

a conductor piece provided on housing and forming portion of an electric circuit, the conductor piece including a cutoff portion disposed crossing the accommodating space and configured to be cut off by the projectile; and an arc-extinguishing region that is provided in the accommodating space and in which a coolant material is disposed, the arc-extinguishing region being configured to receive the cutoff portion after being cut off, wherein the projectile includes a first projectile configured to cut off the cutoff portion from the conductor piece by being projected by the energy received from the igniter, and a second projectile configured to press, into the arc-extinguishing region, the cutoff portion cut off by the first projectile.

2. The electric circuit breaker device according to claim 1, wherein the second projectile is attached to the first projectile prior to actuation of the igniter, and is projected from the first projectile by the energy received from the igniter.

3. The electric circuit breaker device according to claim 2, wherein the second projectile is smaller in size than the first projectile.

4. The electric circuit breaker device according to claim 2, wherein the second projectile is smaller in a transverse cross-sectional area than the first projectile.

5. The electric circuit breaker device according to claim 2, wherein the second projectile is attached to the first projectile with the second projectile positioned coaxially with the first projectile prior to actuation of the igniter.

6. The electric circuit breaker device according to claim 2, wherein the second projectile is attached to the first projectile with a center axis of the second projectile extending through or near a planar center portion of the cutoff portion prior to actuation of the igniter.

7. The electric circuit breaker device according to claim 2, wherein the first projectile includes a cutoff surface disposed facing the cutoff portion prior to actuation of the igniter and configured to cut off the cutoff portion, an attachment recessed portion opening in the cutoff surface and configured to be attached with the second projectile, and a communication path through which the energy received from the igniter is guided to a pressure receiving portion of the second projectile attached to the attachment recessed portion.

* * * * *